US006481767B2

(12) United States Patent
Pool

(10) Patent No.: US 6,481,767 B2
(45) Date of Patent: Nov. 19, 2002

(54) BATTERY CARRIER DEVICE

(75) Inventor: James L. Pool, deceased, late of Clarinda, IA (US), by Karan Pool, executrix

(73) Assignee: Lisle Corporation, Clarinda, IA (US)

(*) Notice: Subject to any disclaimer, the term of this patent is extended or adjusted under 35 U.S.C. 154(b) by 0 days.

(21) Appl. No.: 10/103,402

(22) Filed: Mar. 21, 2002

(65) Prior Publication Data

US 2002/0109363 A1 Aug. 15, 2002

Related U.S. Application Data

(63) Continuation-in-part of application No. 09/784,714, filed on Feb. 15, 2001, now abandoned.

(51) Int. Cl.⁷ ................................................ B65G 7/12
(52) U.S. Cl. ......................................... 294/16; 294/903
(58) Field of Search .......................... 294/15, 16, 27.1, 294/33, 34, 103.1, 168, 903

(56) References Cited

U.S. PATENT DOCUMENTS

| 755,044 | A | * | 3/1904 | Rafield | 294/16 |
| 1,529,518 | A | * | 3/1925 | Voeller | 294/15 X |
| 2,510,596 | A | * | 6/1950 | Murphy | 294/16 X |
| 2,794,666 | A | * | 6/1957 | Bishman | 294/16 |
| 2,829,917 | A | * | 4/1958 | Wiora | 294/16 X |
| 3,414,909 | A | * | 12/1968 | Provi et al. | 294/16 X |
| 4,055,364 | A | * | 10/1977 | Breite | 294/903 X |

FOREIGN PATENT DOCUMENTS

GB   2257683   *   1/1993   .................. 294/16

* cited by examiner

Primary Examiner—Johnny D. Cherry
(74) Attorney, Agent, or Firm—Banner & Witcoff, Ltd.

(57) ABSTRACT

A battery carrier comprises a handle having first and second ends threadably receiving, respectively, first and second threaded ends of first and second threaded rod members, the first threaded end and the second reverse threaded end being in opposed relation and defining an axis whereby rotation of a connecting member controls the spacing of handle members and attached battery gripping members; each of the gripping members includes an inwardly extending flange having an equal dimension transverse to the axis and extending equally in opposite directions from the axis of the handle by a distance at least two times greater than the width of first and second plate members.

1 Claim, 2 Drawing Sheets

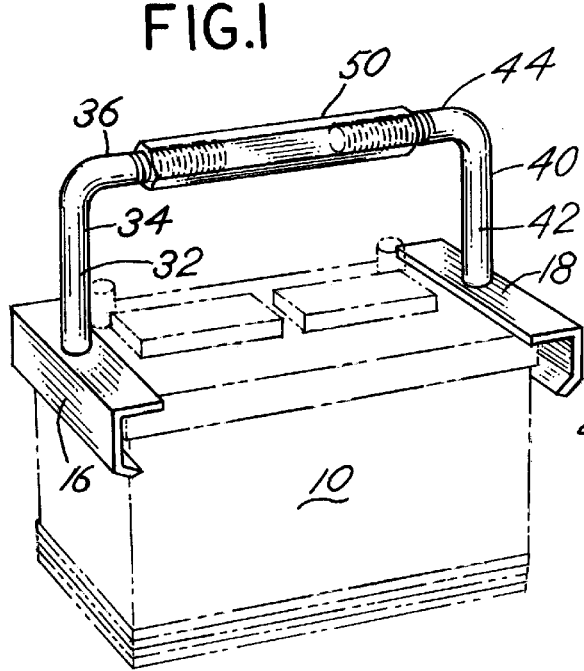
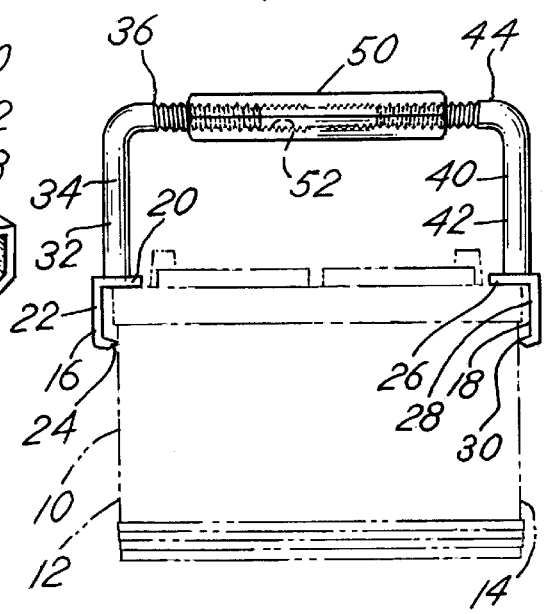
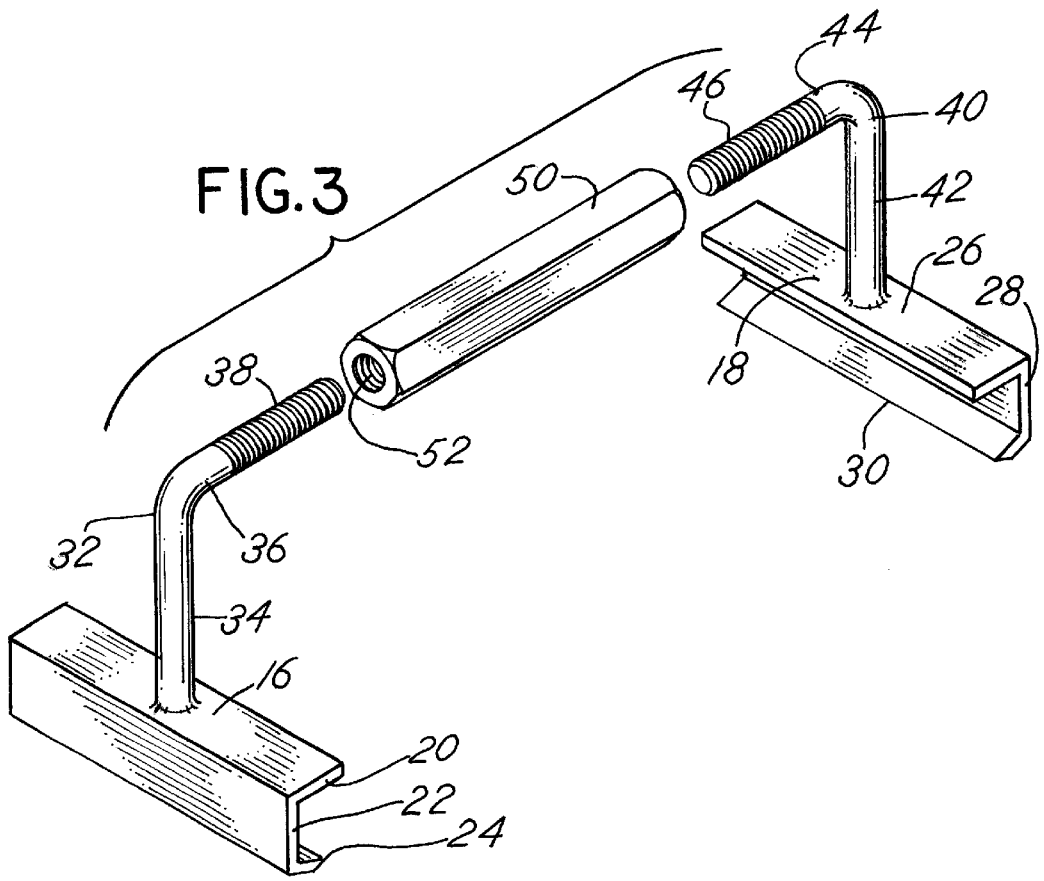

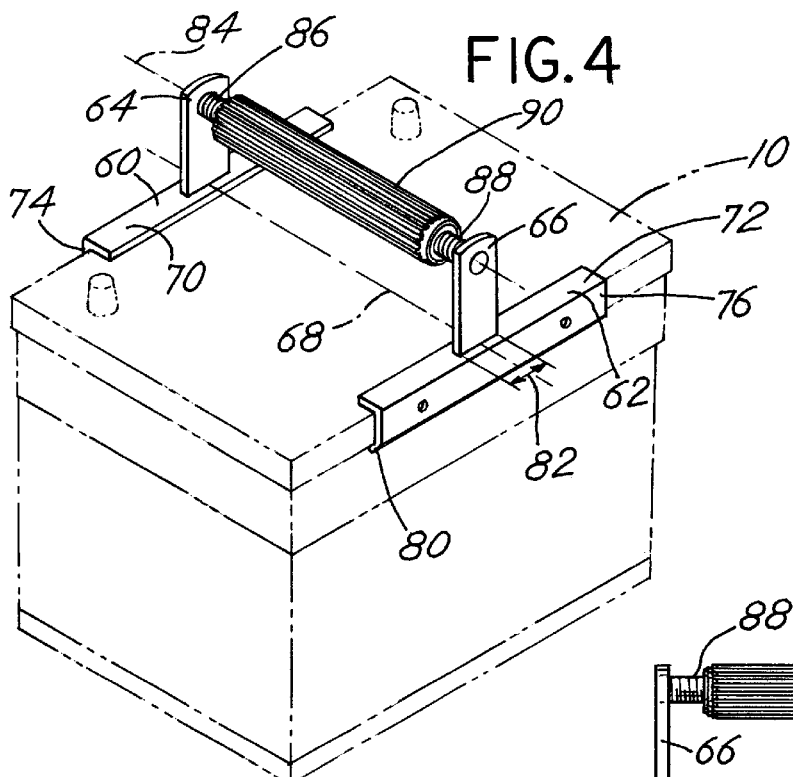
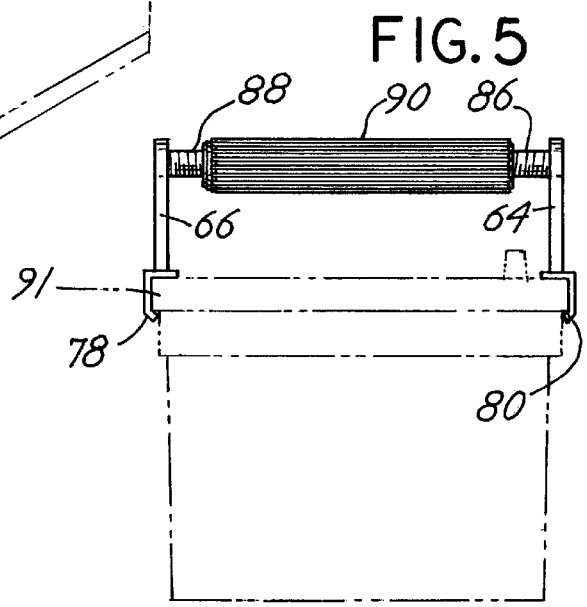
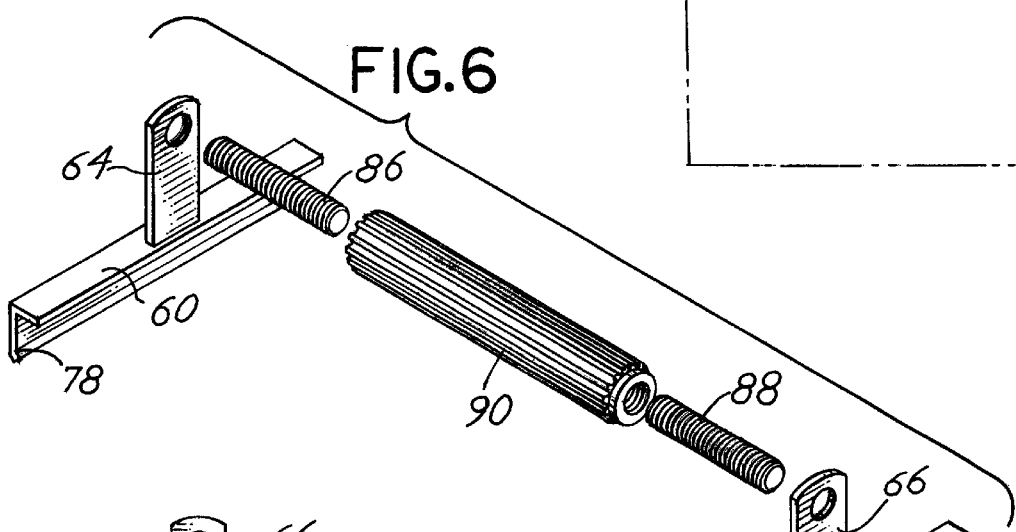
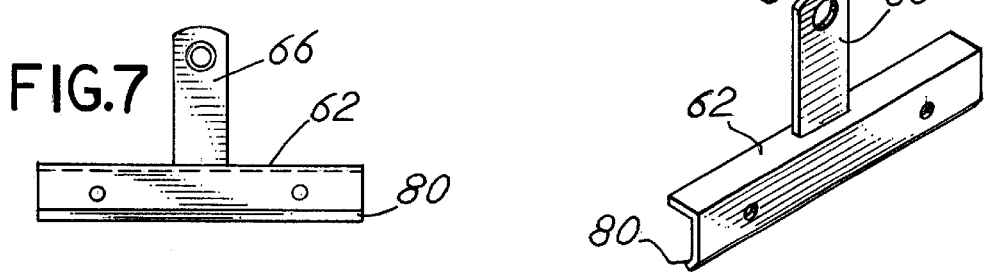

BATTERY CARRIER DEVICE

CROSS REFERENCE TO RELATED APPLICATION

This is a continuation-in-part based upon prior U.S. utility application Ser. No. 09/784,714 filed Feb. 15, 2001 entitled BATTERY CARRIER DEVICE now abandoned, which is incorporated herewith by reference and for which priority is claimed.

BACKGROUND OF THE INVENTION

In a principal aspect, the present invention comprises a vehicle battery carrier which includes opposed gripping members connected by a handle member that telescopically receives the gripping members to adjust and maintain their spacing and thereby effect a grip on an item such as the side walls of a vehicle battery.

Gripping, lifting and transport of a battery from the compartment for a vehicle engine or some other battery compartment in a vehicle may be effected by various types of battery carriers. For example, a flexible handle loop which includes grippers at its opposite ends may be utilized to engage and lift a battery, e.g., U.S. Pat. No. 4,678,217. However, release of the loop will cause release of the grip upon the battery.

An alternative carrier device includes a pair of gripping members connected by a scissors type connection wherein the angular relationship of the connecting scissor members may be set and adjusted, e.g., U.S. Pat. No. 3,820,837 and 4,055,364. Such a carrier may, when the handle or scissor members are released, not retain its grip on the battery.

Thus, there has developed the need for an improved battery carrier which will permit access to restricted spaces and which will enable gripping and maintaining a grip on a battery.

SUMMARY OF THE INVENTION

Briefly, the present invention comprises a battery carrier which includes first and second opposed gripping members that are arranged to grip into the sides of a vehicle battery, for example. Each gripping member has a projecting handle member extending upwardly from the gripping member and then inwardly so that the inner ends project or extend toward one another in opposed relation. A hand held connecting member then engages the opposed sections or elements of the handle members in a manner which permits adjustment of the spacing of the gripping members and retaining the gripping members in the fixed, spaced relationship. In a preferred embodiment, the hand held connecting member comprises a reversibly threaded tube which telescopically receives opposite threaded inner ends of the handle members. By rotating the hand held connecting member, one is able to adjust and maintain the spacing of the gripping members attached to the handle members. The gripping members may include an edge or tooth design to facilitate gripping by the carrier. The carrier may be attached to a vehicle battery, for example, and will remain engaged with the battery so long as the hand held connecting member has been operated to adjust the spacing of the gripping members to tightly grip the battery.

Thus, it is an object of the invention to provide an improved vehicle battery carrier device, which will not only grip and hold a battery or similar item, but also will retain a grip on the carried item, such as a battery, when the carrier device or handle thereof is released.

Yet another object of the invention is to provide an inexpensive, yet rugged, easily assembled and easily manipulated or utilized battery carrier device.

A further object of the invention is to provide a battery carrier device which permits adjustment of the spacing of gripping elements designed to engage and grip a battery.

Yet another object of the invention is to provide a battery carrier device which is easy to adjust and manipulate to accommodate various sizes of batteries.

A further object of the invention is to provide a batter carrier device which may be utilized in restricted spaces.

These and other objects, advantages and features of the invention will be set forth in a detailed description which follows.

BRIEF DESCRIPTION OF THE DRAWING

In the detailed description which follows, reference will be made to the drawing comprised of the following figures:

FIG. 1 is an isometric view of the carrier device of the invention deployed for gripping and carrying a vehicle battery, for example;

FIG. 2 is a front elevation of the battery carrier device of FIG. 1;

FIG. 3 is an exploded isometric view of the battery carrier device of the invention;

FIG. 4 is an isometric view of an alternative embodiment of the carrier device of the invention;

FIG. 5 is a front elevation of the battery carrier of FIG. 4;

FIG. 6 is an exploded isometric view of the battery carrier of FIG. 4; and

FIG. 7 is an end view of the battery carrier of FIG. 4.

DESCRIPTION OF THE PREFERRED EMBODIMENT

Referring to the figures, the vehicle battery carrier of the invention is designed to support and carry automobile batteries 10, for example. Typically, an automobile battery 10 will have a generally rectangular, parallelepiped shape with opposed side walls 12, 14. Often, such a battery 10 is positioned in a vehicle in a receptacle, compartment or other restricted access position or space. Thus, it is desirable to provide a device which will engage with opposite walls 12, 14 of the battery and affect movement of the battery, not only vertically by lifting the battery, but also by sliding movement or horizontally so as to facilitate removal from an engine compartment, for example.

The battery carrier device of the invention includes a first gripping member or channel 16 and an opposed gripping member or channel 18. Channel 16 includes a horizontal, elongate channel section 20 that fits on the top edge of battery 10 and a depending leg 22 with an inwardly projecting tooth or rib 24 to engage a side wall 12. Alternative constructions are possible. That is, the horizontal run 20 may be in the form of a series of legs or elements as may be the vertical run or section 22. The rib 24 may also be in the form of multiple teeth. The tooth 24 is designed to grip, fit into, or cut into the side wall 12 so as to enhance the holding function of the carrier. The second gripping member 18 likewise has, in a preferred embodiment, a horizontal run 26 and a vertical or depending run or leg 28 with an inwardly projecting rib or tooth 30. Generally, channels 16, 18 are mirror images of one another. Preferably, the channels 16, 18 are elongate and extend laterally across the width of the item (battery) to be carried. This arrangement functions to balance the load and spread the load of the item carried.

The first gripping member or channel 16 has a handle member 32 attached thereto. The handle member 32 includes a first vertical run 34 and a second horizontal run 36 with a threaded end 38. Similarly, a second handle member 40 attaches to channel 18 and includes a vertical run 42, a connected horizontal run 44 and a threaded end 46. The ends 38, 46 are axially aligned and in opposed relation to one another in the preferred embodiment. Handle members 32, 40 attach respectively to the midpoints of channels 16, 18 to facilitate balance of the load to be carried by the carrier, though for special situations, the members 32, 34 may be offset from the center of channels 16, 18. A handle connecting member 50, which includes an internal threaded passage 52, may be threadably connected with the ends 38, 46, respectively. Thus, the ends 38, 46 are threaded in opposite directions and threads within the opposite ends of bore or passage 52 of connecting member 50 are compatible with the threads 38, 46, respectively. Rotation of the connecting handle 50 about its centerline axis will cause the handle members 32, 40 to move toward or away from each other in accord with the sense and pitch of threads on the ends 38, 46. In this manner, the gripping channels 16, 18 are moved inwardly or outwardly, depending upon desires and needs. When attaching the assembly to a vehicle battery, the connecting handle 50 is rotated so as to cause the channels 16, 18 to move closer to one another, thereby causing the teeth 24, 30 to engage the side walls 12, 14, respectively. Thus, the carrier is tightly engaged with the sides of the battery 10. The carrier and battery 10 may then be lifted or moved laterally so as to take the battery from its position within a vehicle or to place the battery in a desired location. Reversing the operation effects removal of the carrier from engagement with battery 10.

Other types of adjustable connecting mechanisms for connecting handle 50 and the telescoping ends 38, 46 may be utilized to engage those component parts and insure that they will remain fixed in relative position to one another after appropriate adjustment. For example, some type of sliding connection may be provided, along with a means for locking the elements together. Another equivalent option is to provide a threaded connection for only one of the two opposed handle members 34, 40. The particular shape of the handle members 34, 40 as well as their cross sectional shape, dimensional extents and orientation may be altered without departing from the spirit and scope of the invention. The particular configuration and shape of the channel members 16, 18 may also be varied. Importantly, some type of means for gripping the sides 12, 14 of the battery 10 are considered to be appropriate. More than one set of the handle members 32, 40 may be used with a single set of channels 16, 18. In such circumstance, the handle members may be connected to function together or separate to function independently. Thus, while there has been set forth a preferred embodiment of the invention, it is to be understood that the invention is limited only by the following claims and equivalents thereof.

FIGS. 4 through 7 illustrate a second and preferred embodiment of the invention. Referring to those figures, the first channel 60 and a second channel 62 having a substantially identical construction are positioned opposite one another. Each includes an upwardly extending second plate 64 and 66 welded thereto. The plate is a flat planar steel plate and is welded substantially at the midline axis 68 extending between the midpoint of the channel or gripping members 60, 62. The plates 64, 66 are generally congruent in size and shape. Each plate 64, 66 extends upwardly from an upper run 70 and 72, respectively associated with the gripping channels 60 and 62, respectively. The upper or horizontal run 70 and 72 extends an equal distance from opposite sides of the renter line axis 68 and the plates 64, 66 are parallel.

The channels 60 and 62 further each include depending vertically extending runs 74 and 76 which project or extend on opposite sides of the midline axis 68 in an equal and opposite direction and thus extend at least as far as the horizontal runs 70 and 72, respectively. Projecting inwardly at an angle in the range of about 45° from the vertical plate 74 and 76 are gripping ledges or flanges 78 and 80, respectively, attached and extending inwardly from the vertical plates 74 and 76. The gripping edges 78 and 80 extend in equal and opposite directions inwardly from the midline axis 68 toward each other and are coextensive with the planar vertical plate runs 74 and 76. In the preferred embodiment, the channels 60 and 62 include a horizontal plate run 70, 72 a vertical plate run 74, 76 and a gripping flange 78, 80 all of which are coextensive in their extension in opposite directions from the midline axis 68 and in the preferred embodiment extend at least two to four times the width of the upstanding plates 64 and 66, the width thereof being identified as the width 82 in the figure.

Extending inwardly along a center line axis 84 from plates 64, 66 are first and second threaded rods 86 and 88. The rods 86 and 88 are welded at one end to the plates 64 and 66, respectively. The opposite ends are threaded and may be threadably engaged by a threaded handle 90 having internal threads. The threaded rods 86 and 88 are threaded in a reverse or opposite sense and the internal threads within the handle 90 are appropriately compatible therewith. Thus, by rotating the handle 90 in one sense about the axis 84, the gripping flanges 60 and 62 move together. Rotation in the opposite sense will cause the flanges of the gripping sections 60 and 62 to become spaced one from the other. Preferably, the distance between the axes 68 and 84 is in the range of one to two inches. This distance is minimized in order to diminish the impact of any twisting or torque associated with tightening the handle 90 thereby tending to cause separation of the gripping members 60 and 62. Preferably, the distance between the upper flanges 70 and the axis 84 is no more than two to three times the width 82. Importantly, the gripping members 60 and 62 extend at least three inches in opposite directions from the axis 68 so as to provide in effect a member which can sufficiently clasp against the rim of a battery, for example, or any other item which can be carried without slippage and to accommodate the rims which are discontinuous, broken, or otherwise imperfect. That is the result of extending flanges 78 and 80 which fit under a rim 91 of a battery. However, if a rim 91 is broken or discontinuous, the flanges 78, 80 extend for an adequate distance to ensure that the gripping action will be maintained. With the construct of the present invention it is possible to ensure such gripping action. Further, by welding or attachment of the plates 64 and 66 to top run or horizontal runs 70 and 72, respectively, and providing narrow vertical runs 74 and 76, access to restricted areas within an engine department is promoted. This feature differentiates, among others, the present invention and prior art constructions.

What is claimed is:

1. A battery carrier comprising, in combination:
   a first grip member including an L cross-section shaped channel having a planar run with a midpoint and a depending run and further including a first inward extending flange;
   a second grip member including an L cross-section shaped channel having a planar run with a midpoint and a depending run and further including a second inwardly extending flange in opposed relation to the first flange of the first grip member;

a first plate member having a first width, said first plate member attached at one end to the midpoint of the planar run of the first grip member;

a first threaded rod extending at a right angle from the first plate member along a rod axis;

a second plate member having a second width, said second plate member attached at one end to the midpoint of the planar run of the second grip member;

a second, reverse threaded rod extending at a right angle from the second plate member along said rod axis and projecting toward the first threaded rod;

a hand hold connecting member having first and second ends threadably receiving, respectively, first and second threaded and reverse threaded ends of the first and second rods said first threaded end and said second reverse threaded end being in opposed relation whereby rotation of the connecting member controls the spacing of the plate members and attached grip members, each of said grip members including the inwardly extending flanges having an equal dimension transverse to the axis and extending equally from the axis in opposite directions by a distance at least two times greater than the width of the plate members.

* * * * *